(12) United States Patent
Kyo

(10) Patent No.: US 8,112,613 B2
(45) Date of Patent: Feb. 7, 2012

(54) SELECTING BROADCAST SIMD INSTRUCTION OR CACHED MIMD INSTRUCTION STORED IN LOCAL MEMORY OF ONE OF PLURALITY OF PROCESSING ELEMENTS FOR ALL ELEMENTS IN EACH UNIT

(75) Inventor: Shorin Kyo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/030,952

(22) Filed: Feb. 18, 2011

(65) Prior Publication Data

US 2011/0138151 A1 Jun. 9, 2011

Related U.S. Application Data

(62) Division of application No. 12/917,918, filed on Nov. 2, 2010, which is a division of application No. 12/162,551, filed as application No. PCT/JP2007/065620 on Aug. 9, 2007, now Pat. No. 7,853,775.

(30) Foreign Application Priority Data

Aug. 23, 2006 (JP) ................................ 2006-225963

(51) Int. Cl.
*G06F 15/80* (2006.01)
(52) U.S. Cl. ......................... 712/20; 712/205
(58) Field of Classification Search .................. None
See application file for complete search history.

(56) References Cited

U.S. PATENT DOCUMENTS

| 4,891,787 A | | 1/1990 | Gifford | |
|---|---|---|---|---|
| 5,197,140 A | * | 3/1993 | Balmer | .......................... 711/220 |

(Continued)

FOREIGN PATENT DOCUMENTS

JP 59-16071 1/1984

(Continued)

OTHER PUBLICATIONS

International Search Report dated Nov. 13, 2007 from U.S. Appl. No. 12/162,551.

(Continued)

*Primary Examiner* — Kenneth Kim
(74) *Attorney, Agent, or Firm* — Scully, Scott, Murphy & Presser, P.C.

(57) ABSTRACT

Disclosed is a mixed mode parallel processor system in which N number of processing elements PEs, capable of performing SIMD operation, are grouped into M (=N÷S) processing units PUs performing MIMD operation. In MIMD operation, P out of S memories in each PU, which S memories inherently belong to the PEs, where P<S, operate as an instruction cache. The remaining memories operate as data memories or as data cache memories. One out of S sets of general-purpose registers, inherently belonging to the PEs, directly operates as a general register group for the PU. Out of the remaining S−1 sets, T set or a required number of sets, where T<S−1, are used as storage registers that store tags of the instruction cache.

2 Claims, 6 Drawing Sheets

U.S. PATENT DOCUMENTS

| | | | |
|---|---|---|---|
| 5,239,654 A | | 8/1993 | Ing-Simmons et al. |
| 5,361,367 A | * | 11/1994 | Fijany et al. ............... 712/15 |
| 5,420,809 A | | 5/1995 | Read et al. |
| 5,475,856 A | | 12/1995 | Kogge |
| 5,535,410 A | | 7/1996 | Watanabe et al. |
| 5,664,214 A | * | 9/1997 | Taylor et al. ............... 712/20 |
| 5,680,597 A | * | 10/1997 | Kumar et al. ............... 712/226 |
| 5,805,915 A | | 9/1998 | Wilkinson et al. |
| 6,766,437 B1 | | 7/2004 | Coscarella et al. |
| 7,395,408 B2 | | 7/2008 | Tanaka et al. |
| 7,730,280 B2 | * | 6/2010 | Pechanek et al. ............... 712/20 |
| 2004/0133765 A1 | | 7/2004 | Tanaka et al. |

FOREIGN PATENT DOCUMENTS

| | | |
|---|---|---|
| JP | 4-291659 | 10/1992 |
| JP | 5-20283 | 1/1993 |
| JP | 6-68053 | 3/1994 |
| JP | 2647315 | 5/1997 |
| JP | 3199205 | 6/2001 |
| JP | 2004-171530 | 6/2004 |
| KR | 1997-8529 B | 5/1997 |

OTHER PUBLICATIONS

Korean Official Action dated Jul. 9, 2009 from U.S. Appl. No. 12/162,551.

U.S. Official Action dated Sep. 10, 2009 from U.S. Appl. No. 12/162,551.

Fineberg, S. A. et al. "Experimental analysis of communication/data-conditional aspects of a mixed-mode parallel architecture via synthetic computations", Proceedings of the Supercomputing Conference New York, Nov. 12-16, 1990; [Proceedings of the Supercomputing Conference], Washington, IEEE Comp. Soc. Press, US, vol. Conf. 3, Nov. 12, 1990, pp. 637-646, XP010019984, DOI: 10.1109/SUPERC.1990.130080, ISBN: 978-0-8186-2056-0.

Extended Supplementary European Search Report dated Jun. 29, 2011 from EP 07792270.6-1243/2056212.

International Preliminary Report on Patentability dated Mar. 5, 2009 from U.S. Appl. No. 12/162,551.

* cited by examiner

SELECTING BROADCAST SIMD INSTRUCTION OR CACHED MIMD INSTRUCTION STORED IN LOCAL MEMORY OF ONE OF PLURALITY OF PROCESSING ELEMENTS FOR ALL ELEMENTS IN EACH UNIT

CROSS-REFERENCE TO RELATED APPLICATIONS

The present application is a divisional application of U.S. Ser. No. 12/917,918 filed Nov. 2, 2010, which is a divisional of Ser. No. 12/162,551 filed on Jul. 29, 2008, now U.S. Pat. No. 7,853,775 granted Dec. 14, 2010, which is a '371 filing of PCT/JP2007/065620 filed on Aug. 9, 2007 and is based on Convention rights pertaining to JP Patent Application No. 2006-225963 filed on Aug. 23, 2006. The entire disclosures of each of which are incorporated herein by reference thereto.

TECHNICAL FIELD

The present invention relates to processing elements, a mixed mode parallel processor system, a processing method by processing elements, a mixed mode parallel processor method, a processor program by processing elements and a mixed mode parallel processor program. More particularly, it relates to processing elements, a mixed mode parallel processor system, a processing method by processing elements, a mixed mode parallel processor method, a processor program by processing elements and a mixed mode parallel processor program of higher efficiency.

BACKGROUND ART

There has so far been proposed a parallel processor of the so-called SIMD (Single Instruction Multiple Data) system, in which larger numbers of processors or processing elements (PEs) or arithmetic/logic units are operated in parallel in accordance with a common instruction stream. There has also been proposed a parallel processor of the so-called MIMD (Multiple Instruction Multiple Data) system, in which a plurality of instruction streams are used to operate a plurality of processors or processing units (PUs) or a plurality of arithmetic/logic units with a plurality of instruction streams.

With the parallel processor of the SIMD system, it is sufficient to generate the same single instruction stream for a larger number of PEs, and hence it is sufficient to provide a single instruction cache for generating the instruction stream and a single sequence control circuit for implementing conditional branching. Thus, the parallel processor of the SIMD system has a merit that it has higher performance for a smaller number of control circuits and for a smaller circuit scale, and another merit that, since the operations of the PEs are synchronized with one another at all times, data may be exchanged highly efficiently between the arithmetic/logic units. However, the parallel processor of the SIMD system has a disadvantage that, since there is only one instruction stream, the range of problems that may be tackled with is necessarily restricted.

Conversely, the parallel processor of the MIMD system has a merit that, since a larger number of instruction streams may be maintained simultaneously, an effective range of problems to which the system can be applied is broad. There is however a deficiency proper to the parallel processor of the MIMD system that it is in need of the same number of control circuits as the number of the PEs and hence is increased in circuit scale.

There is also proposed an arrangement of a so-called 'mixed mode' parallel processor aimed to achieve the merits of both the SIMD and MIMD systems in such a manner as to enable dynamic switching between SIMD and MIMD systems within the same processor.

For example, there is also disclosed a system in which each processing element (PE) is configured to have a pair of a control circuit and PE so as to enable operation in MIMD mode from the outset and in which all PEs select and execute instruction stream, broadcast over an external instruction bus, in a SIMD mode, while selecting and executing a local instruction stream in a SIMD mode, thereby enabling dynamic switching between a SIMD mode and a MIMD mode (Patent Documents 1 to 4).

[Patent Document 1] JP Patent Kokai Publication No. JP-A59-16071
[Patent Document 2] JP Patent Kokai Publication No. JP-A5-20283
[Patent Document 3] JP Patent No. 2647315
[Patent Document 4] JP Patent No. 3199205

DISCLOSURE OF THE INVENTION

Problems to be Solved by the Invention

It is assumed that the disclosures of the Patent Documents 1 to 4 are incorporated herein by reference. The following analysis has been given by the present invention.

The principal object of the above-described conventional MIMD system based mixed mode parallel processor is to enable highly efficient data exchange between PEs to advantage by switching to a SIMD mode.

However, from the comparison of the conventional mixed mode parallel processor and a parallel processor, which is based solely on a simple SIMD system, and which has a number of PEs equal to that of the conventional mixed mode parallel processor, the numbers of the instruction cache memories or related control circuits, indispensable to deliver an instruction stream to each processing element, especially, an instruction cache memory and register resources for tag storage of an instruction cache, needed in the former processor, are each equal to the number of processing elements. Thus, the number of the processing elements that can be integrated in a circuit chip in the former processor is about one half or less of that in the latter, generally, if the two processors have the same circuit scale. That is, the processing performance of the former processor is decreased to one half or less of that of the latter.

In light of the above, whether or not the conventional mixed mode parallel processor is really more effective than a simple SIMD processor depends appreciably on the proportions of SIMD processing and MIMD processing in an application where SIMD processing and MIMD processing are present together. That is, the conventional mixed mode parallel processor suffers a problem that the higher the proportion of SIMD processing, the lower becomes the efficacy of the mixed mode parallel processor.

It is an object of the present invention to provide a processing element, a mixed mode parallel processor system, a processing method, a mixed mode parallel processor method, a processor program and a mixed mode parallel processor program in which the circuit scale is not increased appreciably and the performance in SIMD processing is not lowered, as compared with that of a simple SIMD processor having the same number of processing elements.

Means to Solve the Problems

A processing element according to the present invention includes means for performing parallel operations with other N−1 number of processing elements in SIMD operation and for performing parallel operations with other S (=N÷M)−1 number (where S and M are natural numbers not smaller than 2) of processing elements in MIMD operation.

A first mixed mode parallel processor system according to the present invention comprises: N number of processing elements that perform parallel operations in SIMD operation. The N number of processing elements are grouped into M (=N÷S) sets (where S and M are natural numbers not smaller than 2) of processing units, in MIMD operation, each of the M sets including S number of processing elements. In MIMD operation, the M sets of processing units perform parallel operations, each other, while S number of the processing elements also perform parallel operations, each other.

The second mixed mode parallel processor system according to the present invention is configured, based on the above first mixed mode parallel processor system in such a manner that in MIMD operation, part of memory resources of the processing unit operates as an instruction cache memory, and general-purpose register resources of the processing units operate as a tag storage area of the instruction cache.

The third mixed mode parallel processor system according to the present invention is configured based on the above second mixed mode parallel processor system in such a manner that the processing unit includes a control circuit that performs instruction cache control and instruction sequence control.

The fourth mixed mode parallel processor system according to the present invention is configured based on the above second or third mixed mode parallel processor system in such a manner that in MIMD operation, P (P<S) out of S number of the memory resources belonging to S number of the processing elements in each of the M sets of processing units operate as instruction cache memories, with the remaining S−P memory resources operating as data memories or as data cache memories. One set of S sets of the general-purpose register resources, belonging to S number of the processing elements, directly operates as the general-purpose register resources of the sole processing unit. T set (T<S−1) or a predetermined constant number out of the remaining S−1 sets, operate as tag storage resources of an instruction cache, with the remaining sets operating as tag storage resources for a data cache in case of using the data cache.

The fifth mixed mode parallel processor system according the present invention is configured based on the above second, third or fourth mixed mode parallel processor system in which there is included a control processing element for performing system control. One of the processing elements in each processing unit, including the instruction cache memory, includes the control circuit and an instruction stream selector that selects an instruction from the control processing element or an instruction from the instruction cache memory. In MIMD operation, the remaining processing elements not including the instruction cache memory receive and execute the instruction from the instruction stream selector.

The sixth mixed mode parallel processor system according to the present invention is configured based on the above second mixed mode parallel processor system in such a manner that there is included a control processing element for performing a system control. Each of S number of the processing elements in each of the processing units includes the control circuit and an instruction stream selector. In MIMD operation, the instruction stream selector of one of the processing elements, including the instruction cache memory, out of the processing elements, selects an instruction from the control processing element or an instruction from the instruction cache memory. The remaining processing elements, not including the instruction cache memory, receive and execute the instruction from the instruction stream selector of the sole processing element including the instruction cache memory.

A processing method by processing elements according to the present invention includes a step of allowing one of N number of processing elements to perform parallel operations with other (N−1) processing elements in SIMD operation, and a step of allowing one of S of the processing elements to perform parallel operations with other S (=N÷M)−1 processing elements, where S and M are natural numbers not smaller than 2.

A first mixed mode parallel processor method according to the present invention is a mixed mode parallel processor method for a mixed mode parallel processor system including N number of processing elements, which N number of processing elements are grouped in MIMD operation into M (=N÷S) sets of processing units, each set including S number of processing elements, where S and M are natural numbers not smaller than 2. The first mixed mode parallel processor method comprises a step of allowing N number of the processing elements to perform parallel operations, in SIMD operation, a step of allowing the M sets of the processing units to perform parallel operations and a step of allowing S number of the processing elements to perform parallel operations in MIMD operation.

The second mixed mode parallel processor method according to the present invention comprises a step of allowing part of memory resources of the processing units to operate as an instruction cache memory, in MIMD operation, and a step of allowing general-purpose register resources of the processing units to operate as a tag storage area of the instruction cache.

The third mixed mode parallel processor method according to the present invention is the above second mixed mode parallel processor method in which a sole control circuit in the processing unit manages a step of performing instruction cache control and instruction sequence control.

The fourth mixed mode parallel processor method according to the present invention is the above second or third mixed mode parallel processor method in which, during the MIMD operation, each of the M sets of the processing units manages a step of allowing P out of S memory resources belonging to S number of the processing elements, where P<S, to operate as instruction cache memories, and allowing the remaining S−P memory resources to operate as data memories or as data cache memories, a step of allowing one of S sets of the general-purpose register resources, belonging to S number of the processing elements, to directly operate as the general-purpose register resources of the processing unit, and a step of allowing T or a predetermined constant number of sets out of the remaining S−1 sets, where T<S−1, to operate as tag storage resources for instruction cache, and allowing the remaining sets to operate as data cache tag storage resources in case of using a data cache.

The fifth mixed mode parallel processor method according to the present invention is the above second, third or fourth mixed mode parallel processor method for the mixed mode parallel processing including the control processing element for global control. The present mixed mode parallel processor method comprises a step of the instruction stream selector of the sole processing element in the processing unit, including the instruction cache memory, selecting an instruction from the control processing element for global control or an instruction from the instruction cache memory, and a step of the remaining processing elements, not including the instruction cache memory, receiving and executing the instruction from the instruction stream selector during the MIMD operation.

The sixth mixed mode parallel processor method according to the present invention is the above second mixed mode parallel processor method for the mixed mode parallel processing including the control processing element for global control. The present mixed mode parallel processor method comprises a step of the instruction stream selector of the sole processing element in the processing unit, including the instruction cache memory, selecting an instruction from the control processing element for global control or an instruction from the instruction cache memory, during the MIMD operation, and a step of the remaining processing elements, not including the instruction cache memory, receiving and executing the instruction from the instruction stream selector of the sole processing element including the instruction cache memory.

A program for processing according to the present invention comprises a step of allowing one of the processing elements to perform parallel operations, in SIMD operation, with other (N−1) processing elements, and a step of allowing one of S of the processing elements to perform parallel operations, in MIMD operation, with other S (=N÷M)−1 processing elements, where S and M are natural numbers not smaller than 2.

A first mixed mode parallel processor program for a mixed mode parallel processor system, which system includes N number of processing elements grouped into M (=N÷S) sets of processing units in MIMD operation, where S and M are natural numbers not smaller than 2. Each of the M sets includes S number of processing elements. The program allows the mixed mode parallel processor system to execute a step of allowing N number of the processing elements in the mixed mode parallel processor system to perform parallel operations in SIMD operation, and a step of allowing the M sets of the processing units to perform parallel operations and allowing S number of the processing elements to perform parallel operations in MIMD operation.

The second mixed mode parallel processor program according to the present invention is the above first mixed mode parallel processor program further comprising a step of allowing part of memory resources of the processing units to operate as an instruction cache memory, in MIMD operation, and a step of allowing general-purpose register resources of the processing units to operate as a tag storage area for the instruction cache.

The third mixed mode parallel processor program according to the present invention is the above second mixed mode parallel processor program further comprising a step of allowing a sole control circuit in the processing unit to perform instruction cache control and instruction sequence control.

The fourth mixed mode parallel processor program according to the present invention is the above second or third mixed mode parallel processor program further comprising a step of allowing P of the S memory resources belonging to S number of the processing elements, in each of the processing units, where P<S, to operate as instruction cache memories, and allowing the remaining S−P memory resources to operate as data memories or as data cache memories, in MIMD operation, a step of allowing one of S sets of the general-purpose register resources, belonging to S number of the processing elements, to directly operate as the general-purpose register resources of the processing units, and a step of allowing T or a predetermined constant number of sets out of the remaining S−1 sets, where T<S−1, to operate as tag storage resources for instruction cache, and allowing the remaining sets to operate as data cache tag storage resources in case of using a data cache.

Meritorious Effects of the Invention

The present invention has a merit that a mixed mode parallel processor may be implemented in which, as compared to the simple SIMD processor having the same number of PEs, the processing performance at the time of SIMD processing may be prevented from being lowered even though the circuit scale is not appreciably increased.

The reason is that N number of processing elements perform parallel operations with other (N−1) processing elements in SIMD operation and S out of N number of the processing elements perform parallel operations with other (=N÷S)−1 processing elements, in MIMD operation, where S is a natural numbers not smaller than 2.

EXPLANATION OF REFERENCE SIGNS

Figure 1:
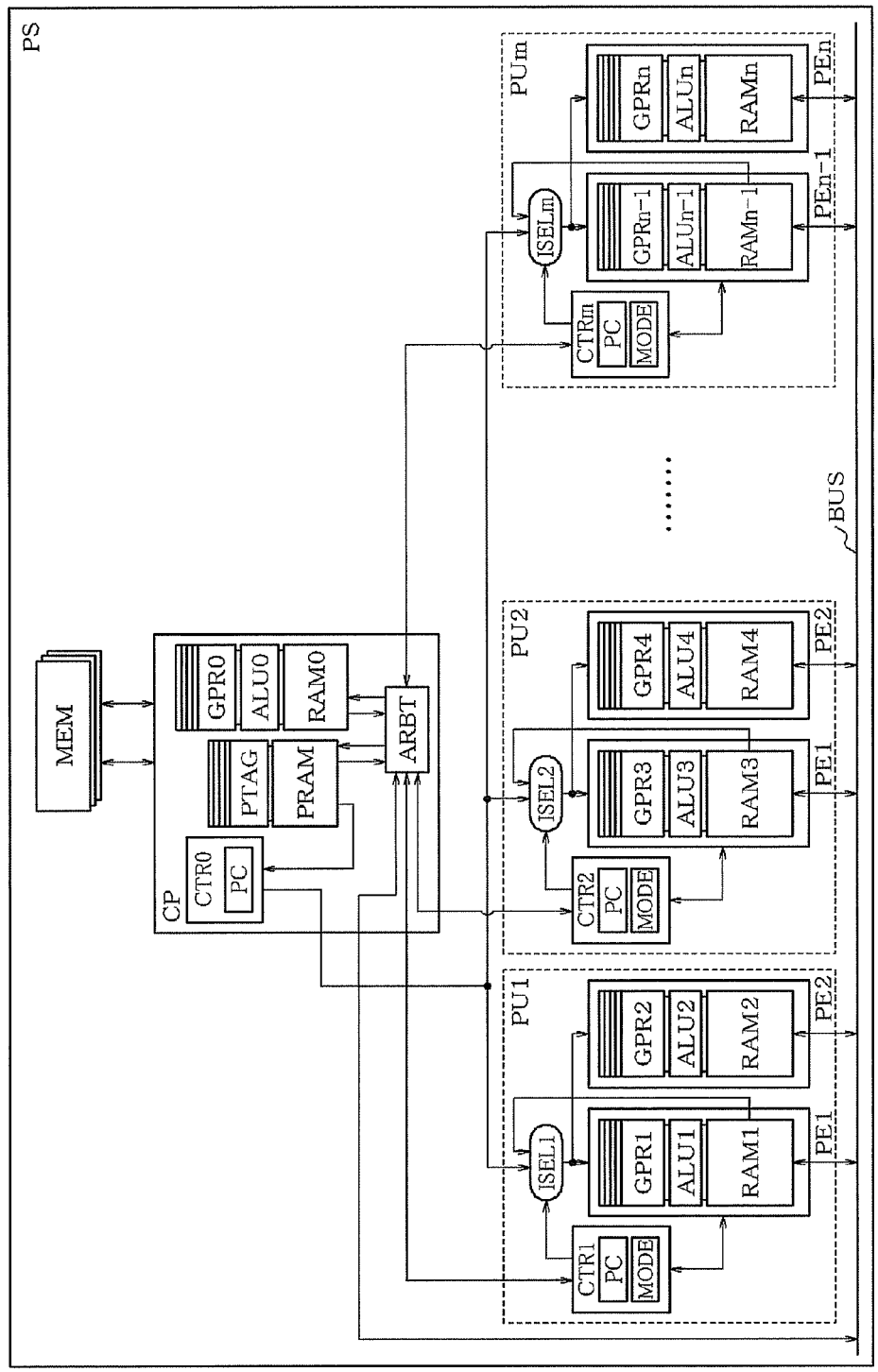
FIG. 1 is a block diagram showing the configuration of a first exemplary embodiment of the present invention.

PS mixed mode parallel processor system
CP control processing element
PE1~PEn processing elements
MEM main memory
BUS common bus
PU1 processing unit
PU1~PUm processing units
RAM1~RAMn memories
GPR1~GPRn register resources
ALU1~ALUn arithmetic/logic units
ISEL1~ISELm instruction stream selectors
PC program counters
MODE mode designation register
CTR1~CTRm control circuits
CTR1 control circuit
RAM0 memory
GRP0 register resource
CTR0 control circuit
ALU0 arithmetic/logic unit
ARBT arbitration circuit
FF1~FFr general-purpose registers
ID1, I D2 instruction decoder circuits
SELG1~SELGr data selectors
RSEL1~RSEL2 operand readout selectors
CSEL1 control selector
SELAD1 address selector
CMP1 comparator circuit

PREFERRED MODES FOR CARRYING OUT THE INVENTION

A mixed mode parallel processor system according to the present invention includes N number of processing elements PEs capable of performing SIMD operations. Each PE includes a memory (resource) and general-purpose registers (resources) for storing the temporary results of partial operation in the course of the arithmetic/logic operation. The mixed mode parallel processor system also includes M (=N÷S) instruction cache control circuits, not containing an instruction cache tag storage area, and M number of instruction sequence control circuits. It is noted that M, N and S are natural numbers.

A group consisting of S number of processing elements PEs, neighboring to each other, a sole instruction cache control circuit and a sole instruction sequence control circuit makes up a processing unit PU that performs MIMD operations. The instruction cache control circuit and the instruction sequence control circuit may also be included in the sole processing element PE.

In MIMD operation, P number (P<S) of memories out of S number of memories (resources) in each processing unit PU operate as instruction cache memories, with the remaining memories (resources) operating as data memories or as data cache memories. One set out of S sets of general-purpose registers (resources) directly operates as the general-purpose registers (resources) of the processing unit PU.

T set (T<S−1) out of the remaining S−1 sets operate as tag storage registers for instruction cache (directory resources). The remaining S−1−T sets may be arranged as data cache memories operating as tag storage registers for data cache (resources).

The mixed mode parallel processor system also includes selectors for switching write data to the memories (resources) or general-purpose registers (resources) for use in SIMD operation or for use in MIMD operation.

With the above configuration, only the sole instruction sequence control circuit, several selectors and a sole instruction cache control circuit for generating control signals for the instruction sequence control circuit or the selectors per each PE are sufficient as additional circuits needed to implement the mixed mode parallel processor. It is noted that the instruction cache control circuit does not include the tag storage area for instruction cache per se, and is responsible.

Thus, it is unnecessary to add the instruction cache memory as well as the tag storage registers (resources) for the instruction cache most liable to increase the circuit scale in implementing the MIMD operations. The mixed mode parallel processor system PS of the present invention thus provides for parallel operations by N number of processing elements in SIMD mode and parallel operations by M (=N÷S) processing units in MIMD mode. Further, the mixed mode parallel processor system PS of the present invention may be implemented with only minor increase in circuit scale as compared with the simple SIMD processor made up of N number of processing elements.

Referring to the drawings, a first exemplary embodiment of the present invention is now described in detail. FIG. 1 is a block diagram showing the configuration of a mixed mode parallel processor system PS according to the first exemplary embodiment of the present invention. Referring to FIG. 1, the mixed mode parallel processor system PS according to the first exemplary embodiment of the present invention includes a control processing element CP for performing global control, n number of processing elements PE1, PE2, PE3, PE4, . . . , PEn−1, PEn, and a main memory MEM. The processing elements PE1, PE2, PE3, PE4, . . . , PEn−1, PEn are connected over a common bus BUS to the control processing element CP.

The mixed mode parallel processor system PS is for a case where S=2, and hence M=N/2, that is, for a case where processing units PU1, PU2, . . . , PUm, each performing a sole MIMD operation, are each made up of two processing elements PEi and PEi+1 each performing a SIMD operation.

The processing elements PE1 to PEn include memories RAM1 to RAMn (resources), register resources GPR1 to GPRn, and arithmetic/logic units ALU1 to ALUn, respectively. The processing units PU1 to PUm include instruction stream selectors ISEL1 to ISELm, and control circuits CTR1 to CTRm, each of which includes a program counter PC and a mode designation register MODE and performs instruction sequence control and instruction cache control, respectively. It is noted that the instruction stream selectors ISEL1 to ISELm and the control circuits CTR1 to CTRm can be provided in odd-numbered processing elements PE1, PE3, . . . , PEn−1.

The control processing element CP, providing an instruction stream to the entire PE array in SIMD mode operation, includes a data memory RAM0 (resource), a register resource GRP0, a control circuit CTR0, an arithmetic/logic circuit ALU0 and an arbitration circuit ARBT.

Figure 2:
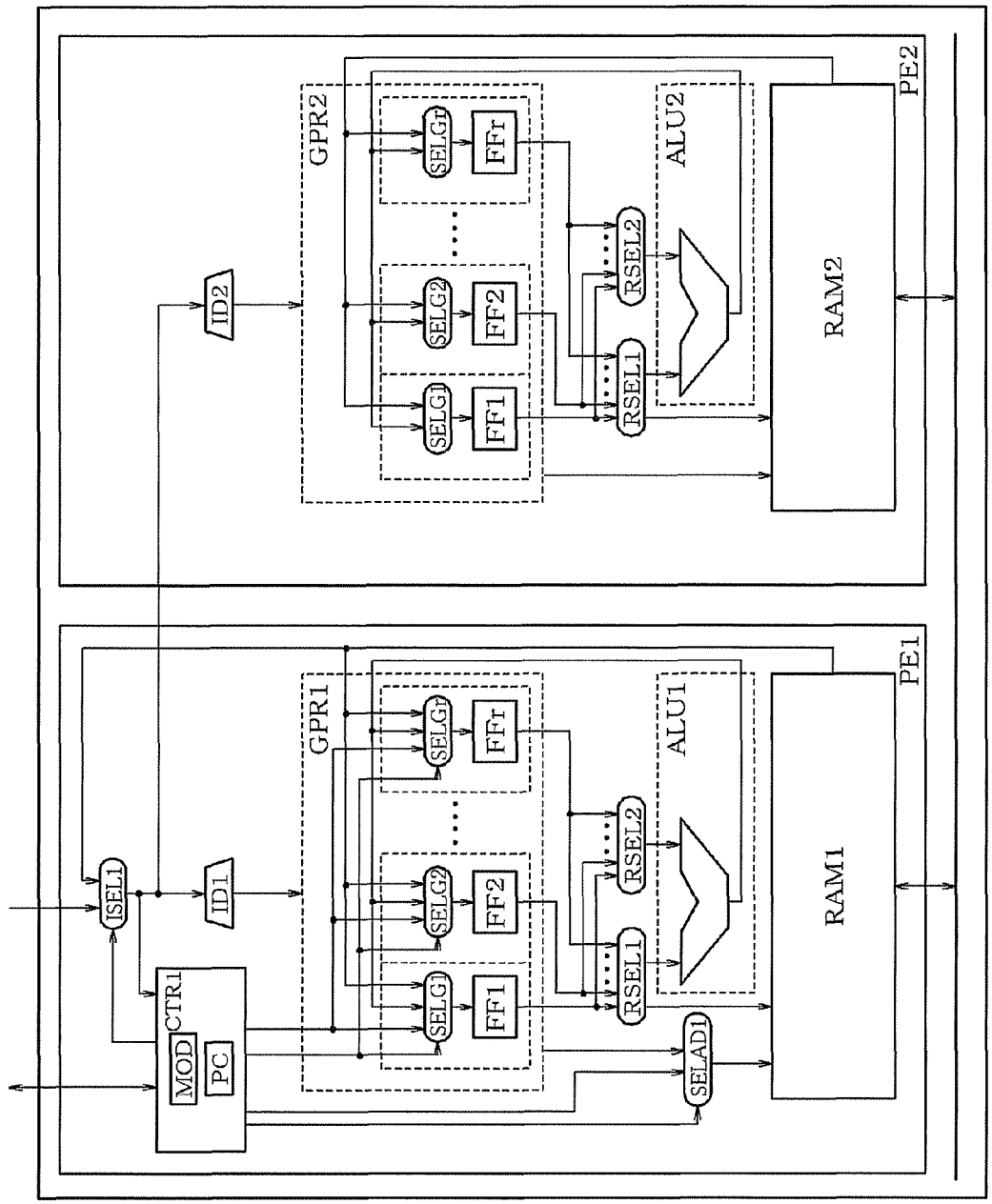
FIG. 2 is a block diagram showing a detailed structure of the first exemplary embodiment of the present invention.

FIG. 2 is a block diagram showing a detailed configuration of the processing unit PU1. Referring to FIG. 2, the processing unit PU1 includes processing elements PE1 and PE2. The instruction stream selector ISEL1 of the processing element PE1 selects an instruction from the control processing element CP or an instruction word from the memory RAM1 to output the so selected instruction or instruction word to the inside of the processing element PE1 and to the processing element PE2.

Instruction decoder circuits ID1 and ID2 decode the instruction word to generate control signals. It is noted that two sets each of r number of general-purpose registers FF1 to FFr are register resources of the processing elements PE1 and PE2.

Data selectors SELG1 to SELGr each select one of 'write-back data from the arithmetic/logic unit ALU1', 'write-back data from the memory RAM1', and 'tag update data generated by the control circuit CTR1', as inputs to the general-purpose registers FF1 to FFr of the processing element PE1.

An address selector SELAD1 selects which of an address value from the control circuit CTR1 and an address value from the register resource GPR1 is to be used for accessing the memory RAM1. Selectors for operand readout RSEL1 and RSEL2 select a source operand, to be supplied to the arithmetic/logic unit ALU1 (arithmetic/logic unit ALU2), out of output data of the register resource GPR1 (register resource GPR2).

With the above-described configuration, the mixed mode parallel processor operates in N parallel in SIMD mode and in M (=N/2) parallel in MIMD mode substantially as follows. It is noted that, in the following description, reference is sometimes made only to reference numerals or symbols for particular components, without stating the names of the components.

Referring to FIG. 1, CTR1 to CTRn control the instruction stream selectors ISEL1 to ISELm, in SIMD mode operation, in order to select the instruction broadcast from CP. By so doing, the same instruction is broadcast to PE1 to PEn, as a result of which the SIMD operation by these N number of PE1 to PEn is carried out.

Referring to FIG. 2, CTR1 in PU1 controls SELG1 to SELGr, in MIMD mode operation, in order to provide write data (an instruction cache tag) to FF1 to FFr of PE1. Hence, FF1 to FFr of PE1 may now be usable for storing tag of the instruction cache. CTR1 controls SELAD1 to select an access address value to RAM1 from CTR1, instead of from GPR1. Accordingly, RAM1 may thus be usable as an instruction cache memory.

With PE2, the circuit from GPR2 to ALU2 functions, in MIMD mode operation, as a data path for performing the arithmetic/logic processing operation specified by an instruction, in the same way as in SIMD mode operation. However, these arithmetic/logic processing operations are specified by the result of decoding by the instruction decoder circuit ID2 of the instruction as read out by the memory RAM1. Thus, in the MIMD mode, the major portions of the hardware resources in each of PE1, PE3, PE5 and so forth in each of the processing units PU1 to PUm are used as hardware elements necessary for issuing the instructions in MIMD mode, thus enabling the instructions to be issued efficiently. The so issued instructions are used in the other processing elements PE4, PE6 and so forth.

Figure 3:
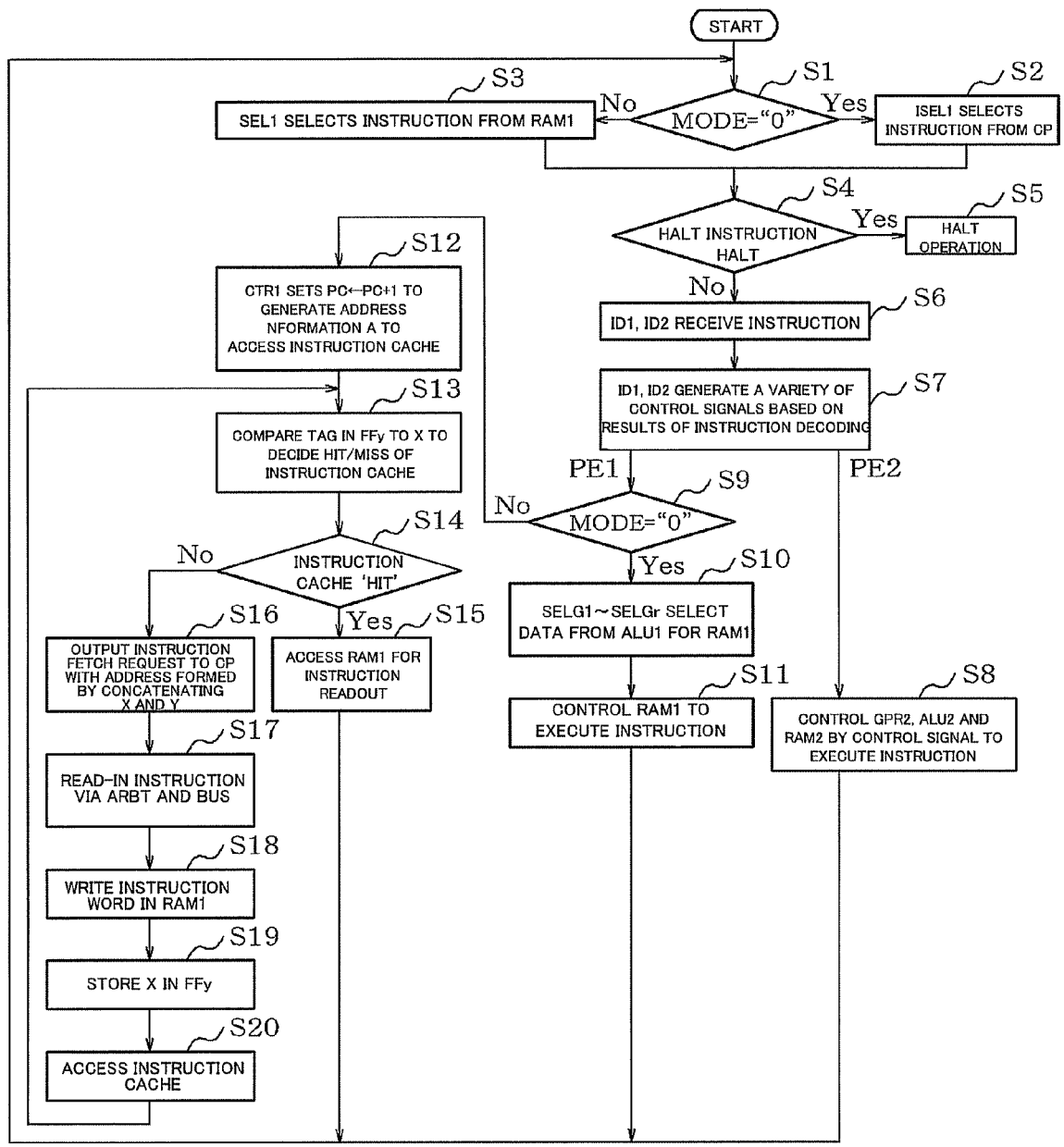
FIG. 3 is a flowchart for illustrating the operation of the first exemplary embodiment of the present invention.

The operation of the first exemplary embodiment of the present invention is now described with reference to the drawings. FIG. 3 is a flowchart for illustrating the operation of PU1 of the present exemplary embodiment. For simplicity of explanation, it is assumed that PE1 and PE2 in the present exemplary embodiment include the arithmetic/logic units (ALU1, ALU2), respectively, and execute one instruction for each cycle at the maximum. It is however possible for each PE1 and PE2 to include a plurality of arithmetic/logic units to execute a plurality of instructions simultaneously for each cycle.

Moreover, it is assumed that, in the present exemplary embodiment, in PU1, PE1 and PE2 which perform two SIMD operations, perform a sole MIMD operation, again for simplicity of explanation. In the present exemplary embodiment, the number of bits D of data read out per cycle from RAM1 and RAM2 (memory resources) of PE1 and PE2 coincides with the instruction word length L. It is however possible that $D \geq L$, in which case it is sufficient to use only L out of the D bits.

Alternatively, when $D<L$, such a configuration is possible in which design parameters of RAM1 and RAM2 (memory resources) in PE1 and PE2 are adjusted so that $D \geq L$. Still alternatively, such a configuration is also possible in which the number of the processing elements in the processing unit performing a sole MIMD operation is increased to, for example, three to four, in which case the memory resources of two or three of the processing elements may be combined together for use as an instruction cache memory.

Referring to FIG. 3, PU1 operates in the following manner to implement the MIMD operation through the use of hardware resources of the two processing elements PE1 and PE2 which inherently perform the SIMD operations. The value of MODE in CTR1, which can be read out or written by CP, indicate SIMD operation (the value of MODe is "0") or MIMD operation (the value of MODe is "1").

CP writes "0" in MODE in CTR1 of PU1 to set the operation of PU1 to the SIMD mode or writes "0" to set the operation of PU1 to the MIMD mode.

The cycle-based operation of PU1 is now described with reference to the flowchart shown in FIG. 3. Initially, when MODE="0" (when the result of step S1 of FIG. 3 is YES), ISEL1 selects the instruction broadcast from CP (step S2) and, when MODE="1" (when the result of step S1 is NO), ISEL1 selects the instruction as read out from RAM1.

The CTR1 decides whether or not the instruction as selected is for commanding halt operation (HALT). If the instruction is for HALT (if the result of step S4 is YES), CTR1 halts the operations of PE1, PE2 (step S5).

Next, ID1, ID2 receive the so selected instruction from ISEL1 (step S6) and decodes the instruction to generate a variety of control signals needed for executing the instruction (step S7). PE2 controls GPR2, ALU2 and RAM2, by the control signal, generated by ID, to execute the instruction (step S8).

On the other hand, PE1, if MODE="0" (if the result of step S9 is YES), SELG1 to SELGr of GPR1 select data from RAM1 or data from ALU1 to deliver the so selected data to FF1 to FFr (step S10). RAM1 is then controlled to execute the instruction in accordance with the control signal from ID1 (step S11), based on the instruction from CP (step S11).

On the other hand, if MODE="1" (if the result of the step S9 is NO), the instruction word, executed during the next cycle, is read out as follows. CTR1 updates PC to a value equal to the current PC value plus 1, and sets the so updated PC value as the access information for the instruction cache (RAM1) to access the instruction cache (step S12).

Figure 4:
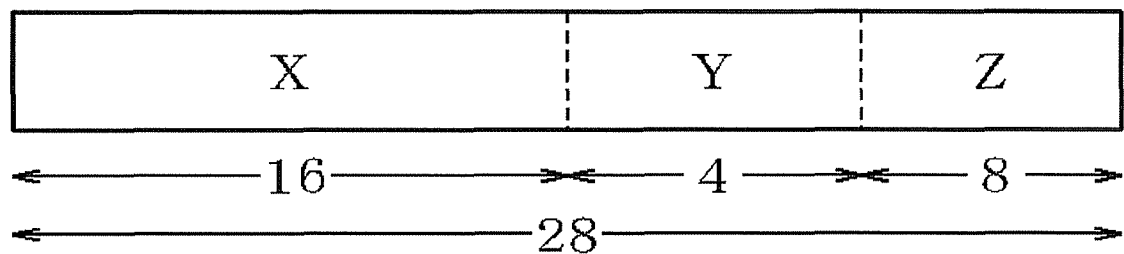
FIG. 4 is a diagrammatic view for illustrating the contents of the access information for an instruction cache of the first exemplary embodiment of the present invention.

The access information A for the instruction cache is now described. The contents of the access information A for the instruction cache are schematically shown in FIG. 4. In this figure, the access information A is made up of an upper order side bit string X, an intermediate bit string Y and a lower order bit string Z.

CTR1 of PE1 compares a cache tag stored in one FFy of the registers FF1 to FFr, and which is specified by Y, with X, to decide whether or not the contents of Y and the bit string X coincide with each other, to make a hit-or-miss decision of the instruction cache (step S13). If the contents of Y coincide with X, that is, in case of an instruction cache hit (result of step S14 is YES), CTR1 accesses RAM1 with an address, which is a bit string made up of a concatenation of Y and Z, in order to read out the instruction.

If conversely the contents of the register FFy are not coincident with X, that is, in case of an instruction cache miss (the result of step S14 is NO), CTR1 outputs an instruction fetch request to CP, with an access address made up of a concatenation of X and Y as an upper order address part, and a number of zeros corresponding to the number of bits of Z as a lower address part.

CTR1 then performs control to read out a number of instruction words corresponding to the size of cache entries from MEM (step S17). CTR1 then writes the instruction words from BUS in the matched entries of RAM1 as the instruction cache (step S18). CTR1 then causes the value X to be stored in FFy via SELGy (step S19).

CTR1 again formulates the access information A for accessing the instruction cache and accesses the instruction cache (step S20) to decide as to hit or miss of the instruction cache (step S13). Since the value X is now stored in FFy, instruction cache 'hit' occurs (the result of the step S14 is YES). CTR1 performs an instruction read access to RAM1 with an address made up of a bit string formed by concatenation of Y and Z (step S15).

By the above operation, the instruction word, used for the next cycle, can be read out from RAM1 which is the instruction cache. It also becomes possible to cause PE1 and PE2 to operate in the SIMD mode of executing the same instruction, or to cause PE1 and P2 to form a sole PU and to operate in the MIMD mode, depending on the MODE value. In addition, with the present exemplary embodiment, a part of PEs may form a processing unit PU that operates in the MIMD mode, at the same time as another part of PEs operates in the SIMD mode.

The above shows an operational example in which RAM1 is used as a cache memory of a one-way configuration. However, RAM1 may also operate as a cache memory of a multiway configuration, if such operation of RAM1 is allowed by an excess number of the general-purpose registers provided in GPR1.

Figure 5:
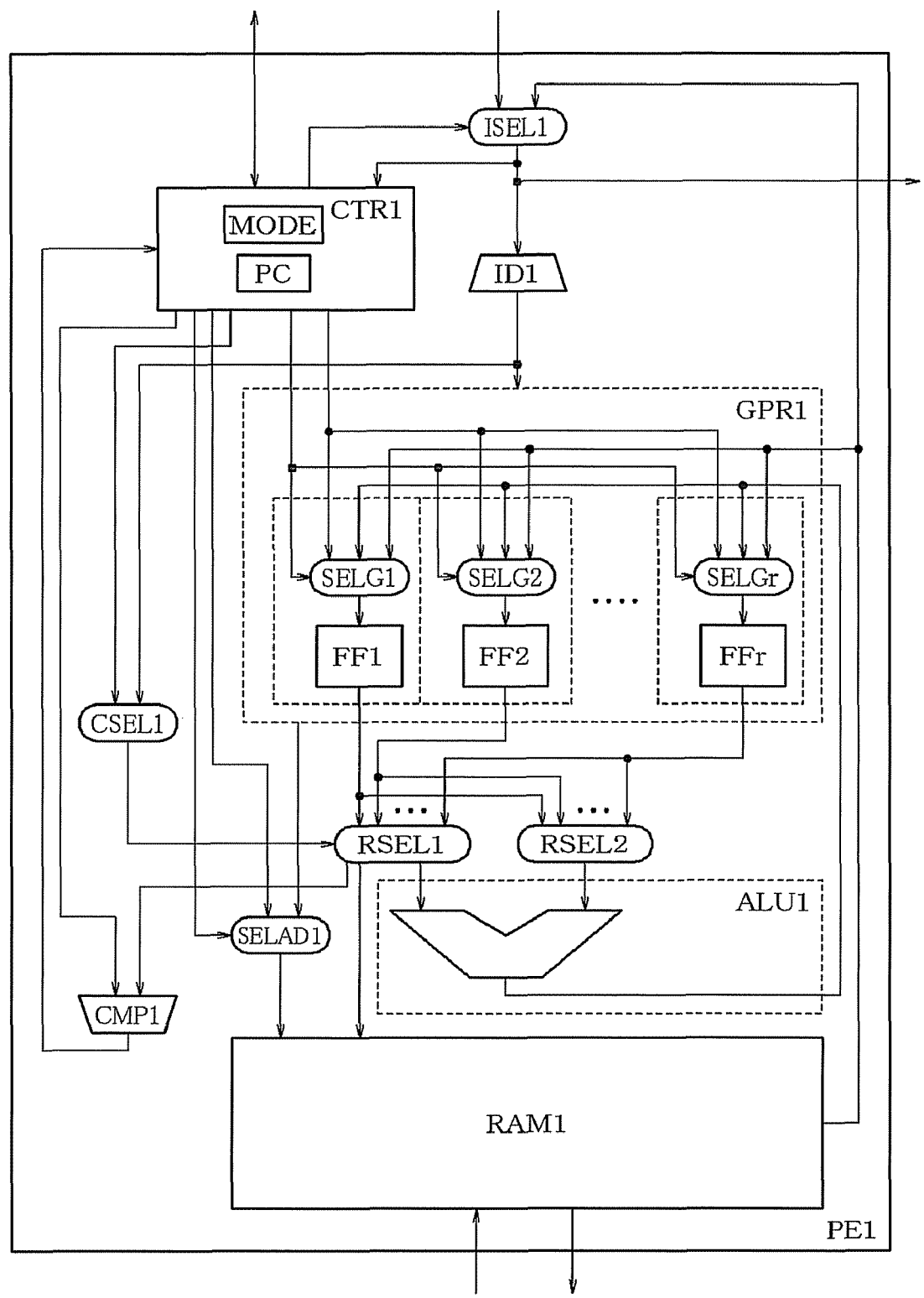
FIG. 5 is a block diagram showing the configuration of an example of the first exemplary embodiment of the present invention.

PE1 according to the first exemplary embodiment of the present invention is now described with reference to the drawings. FIG. 5 is a block diagram showing the configuration of PE1 of the present first exemplary embodiment. In this figure, PE1 includes a control selector CSEL1 (hereinafter referred to simply as CSEL1), not shown in FIG. 2, and a comparator circuit CMP1 (hereinafter referred to simply as CMP1), also not shown in FIG. 2. Although neither CSEL1 nor CMP1 is shown in FIG. 2, this does not mean that PE1 of FIG. 2 lacks in CSEL1 and CMP1. These components are included in PE1 as shown in FIG. 5, which is a detailed example of PE of FIG. 2.

CSEL1 selects a control signal (selection signal) from ID1 in the SIMD mode, while selecting a control signal from CTR1. This control signal from CTR1 is a selection signal corresponding to the value Y. The selection signal for CSEL1 is used as a selection signal for RSEL1.

In the SIMD mode, the output of RSEL1 is data for ALU1 or RAM1. In the MIMD mode, the output of RSEL1 is a tag for the instruction cache, and is delivered to CMP1. This CMP1 compares the tag from RSEL1 with the value of X from CTR1 and delivers the result of comparison to CTR1. The result of comparison for coincidence indicates an instruction cache 'hit', while the result of comparison for non-coincidence indicates an instruction cache 'miss'.

The actual operation and its effect are now described with reference to a more specified example. PE1 to PEn are each a SIMD parallel processor including 16-bit general-purpose registers FF1 to FF16 and RAM1 to RAMn which are each a 4K word memory with each word being a 32-bit.

The processing element PE1 includes SELG1 to SELG16, associated with FF1 to FF16, SELAD1 associated with RAM1, ISEL1 for selecting an instruction from CP or a readout instruction word from RAM1, CTR1 provided with PC and with a mode register MODE, CSEL1 for controlling the selection by RSEL1, and CMP1 for deciding hit or miss of the instruction cache, in addition to the components that make up PE2.

The following is an example of the configuration for combining PE1 and PE2 to enable dynamic switching to a sole PU capable of performing MIMD operation.

The 4K word memory RAM1 of PE1 is used as an instruction cache. The 16 registers FF1 to FF16 are directly used as registers for tag storage registers of the instruction cache. With 28-bit PC in CTR1, the upper 16 bits (=X) of the 28-bit instruction cache access information A are reserved, in meeting with the number of bits 16 of each of the registers FF1 to FF16, as a tag for cache entry, and the instruction cache is of the 16-entry 256 words/entry configuration. Out of the remaining 12 (28–16) bits, the upper 4 bits (=Y) specify the GS entry numbers, while the lower 8 bits (=Z) specify the word positions in each entry (see FIG. 4).

The 16 general-purpose registers may simultaneously be usable as storage registers for a tag associated with each entry of the instruction cache. Based on this allocation, the operation in case of execution of the steps S12 to S20 in the flowchart of FIG. 3 is as follows:

In case the mode value is "1", ISLE1 selects the result of readout from RAM1 as being an instruction. In order for an instruction word to be read out efficiently from a program area on MEM without undue stagnation per each cycle, it is necessary to implement instruction cache control. In the present exemplary embodiment, such instruction cache control is implemented by diverting the pre-existing hardware resources of PE1 as now described.

Initially, the 16-bit value of the contents of the register FFy, as one of the 16 general-purpose registers, specified by the 4-bit value of Y, is compared to the 16-bit value of X, to verify the hit-or-miss of the instruction cache. As a selector for reading out the register FFy, RSEL1, present on a data path of PE1, may directly be used.

If the result of comparison of the contents of FFy to X indicates coincidence, it indicates 'hit' of the instruction cache. In this case, a 12-bit string corresponding to a concatenation of Y and Z becomes an access address for RAM1. This access address is output via SELAD1 to RAM1 that operates as the instruction cache memory. An instruction for the next cycle is read out from RAM1.

If the result of comparison indicates non-coincidence, an access address of 28 bits, of which the upper order 20 bits are a concatenation of 16 bits of X and 4 bits of Y, and the lower 8 bits are all zero, is used. CP1 delivers the access address to CP. From MEM, connected to CP, 256 instruction words, corresponding to the number of words of the cache entries, are output via ARBT and BUS to RAM1. It is noted that, in these instruction words, the bit strings Z are each made up of 8 bits.

The instruction word from MEM is written in an address location of a corresponding cache entry. This address location is an area in RAM1 headed by an address location formed by 12 bits, the upper four bits of which are Y and the lower 8 bits of which are all zero. It is noted that the number 8 of the lower bits is the same as the number of bits of Z. Also, the contents of FFy are changed to the value of X via RSELGy.

The access address of 12 bits, obtained on concatenation of Y and Z, is delivered via SEALD1 to RAM1, so that an instruction of the next cycle is read out from RAM1 that operates as an instruction cache memory.

In this manner, an instruction indispensable for performing the MIMD operations may be read out each cycle from the 28-bit memory space by the sole processing unit PU that is made up of two processing elements in the SIMD parallel processor, herein PE1 and PE2.

Also, RAM1, used by PE1 in SIMD operation as a data memory, is now used as an instruction cache, while FF1 to FF16, used by PE1 in SIMD operation as general-purpose registers, are now used as registers for tag storage of instruction cache. The hardware components added for this purpose, namely ISEL1, CTR1, SELAD1, CSEL1 and CMP1, are only small in quantity.

In the above exemplary embodiment, no validity bit is appended to a tag of each instruction cache implemented on each general-purpose register. In this case, a tag of interest may be deemed to be invalid if the tag is of a zero value. If, in this case, the SIMD mode is to be switched to the MIMD mode, it is necessary to first clear the tag value of the instruction cache entry to zero and then to prevent the PC value from becoming zero by using a software technique.

In another method, it is also possible to extend the tag storage register by one bit and to use the bit as a validity bit, that is, as the information for indicating whether or not the tag of interest is valid. In this case, if the validity bit is "1", the tag of interest is retained to be valid and, in switching from the SIMD mode to the MIMD mode, the validity bits of the totality of the tags are set to zero in unison. In this case, it is unnecessary to prevent the PC value from becoming zero by using a software technique.

The operation and the meritorious effect of the present invention are now described in comparison with the technique of constructing a mixed mode parallel processor based on using the processing elements capable of performing the MIMD operation of the related technique.

If, with the related art technique, an instruction word is to be readable from memory space of 28-bit, and a 4K word instruction cache is to be usable, as in the present exemplary embodiment, it is necessary to provide one more 4K word memory for storage of instruction words, in addition to the 4K word memory inherently present in each PE. Moreover, if instruction cache control is to be exercised as in the present exemplary embodiment, it is necessary to add 16-by-16=256 bit flip-flops as registers for tag storage of instruction cache.

Considering that the general-purpose registers (resources) and the memories (resources) take up the major portion of the area of the processing element PE that performs the SIMD operation, each PE of the related-art-based mixed mode parallel processor would be of a circuit scale twice that in accordance with the present invention.

Thus, the circuit scale of the mixed mode parallel processor of the related art, having the same number of the processing elements in SIMD mode as that of the present invention, is twice that of the present invention. Nevertheless, the peak performance of the mixed mode parallel processor of the related art in SIMD mode operation is about equal to that of the present invention. Although the peak performance of the related art processor in MIMD mode operation is twice that of the processor of the present invention, the circuit scale of the related art processor is twice that of the processor of the present invention. Hence, the related art processor may not be said to be superior to the processor of the present invention from the perspective of the cost performance ratio.

The first effect of the present exemplary embodiment of the invention is that the pre-existing simple SIMD parallel processor, supporting only the SIMD mode, may dynamically be re-constructed to a MIMD parallel processor, capable of processing a broader range of application, even though the increase in circuit scale is only small.

The reason is that, by grouping a plural number of pre-existing processing elements, performing the SIMD operations, into a plurality of sets, and by re-utilizing pre-existing memory or register resources in each set as an instruction cache memory or as an instruction cache entry based tag storage space, it is unnecessary to add new components of the larger circuit scale which might be necessary to implement the MIMD operations.

The second effect of the present exemplary embodiment of the invention is that an application including both the task processed by SIMD and the task processed by MIMD may be processed more effectively than is possible with the conventional mixed mode parallel processor.

The reason is that, in the case of an application including both the task processed by SIMD and the task processed by the MIMD, the former task is more amenable to the parallel processing than the latter task, and that, taking this into consideration, the mixed mode parallel processor according to the present invention is more amenable to SIMD parallel processing than the pre-existing MIMD parallel processor based mixed mode parallel processor, if the two processors are similar in circuit scale.

It is seen from above that, if the design parameters of the processor of the example of the present invention and those of the related art processor remain the same, the cost performance ratio of the processor of the present invention at the time of the SIMD operation is higher by a factor of approximately two than that of the related art processor, with the cost performance ratio at the time of the MIMD operation remaining unchanged.

In case a sole processing unit PU, performing the MIMD operations, is to be constructed by S number of processing units, each performing the SIMD operation, part of the arithmetic/logic units, inherently belonging to the individual processing units, are present unused in the so constructed processing unit PU. These arithmetic/logic units may be interconnected to form a more complex operating unit, such as a division unit or a transcendental function operating unit, which may be utilized from the processing unit PU. It is possible in this case to further improve the operating performance of the processing unit PU than that of the individual processing elements.

Figure 6:
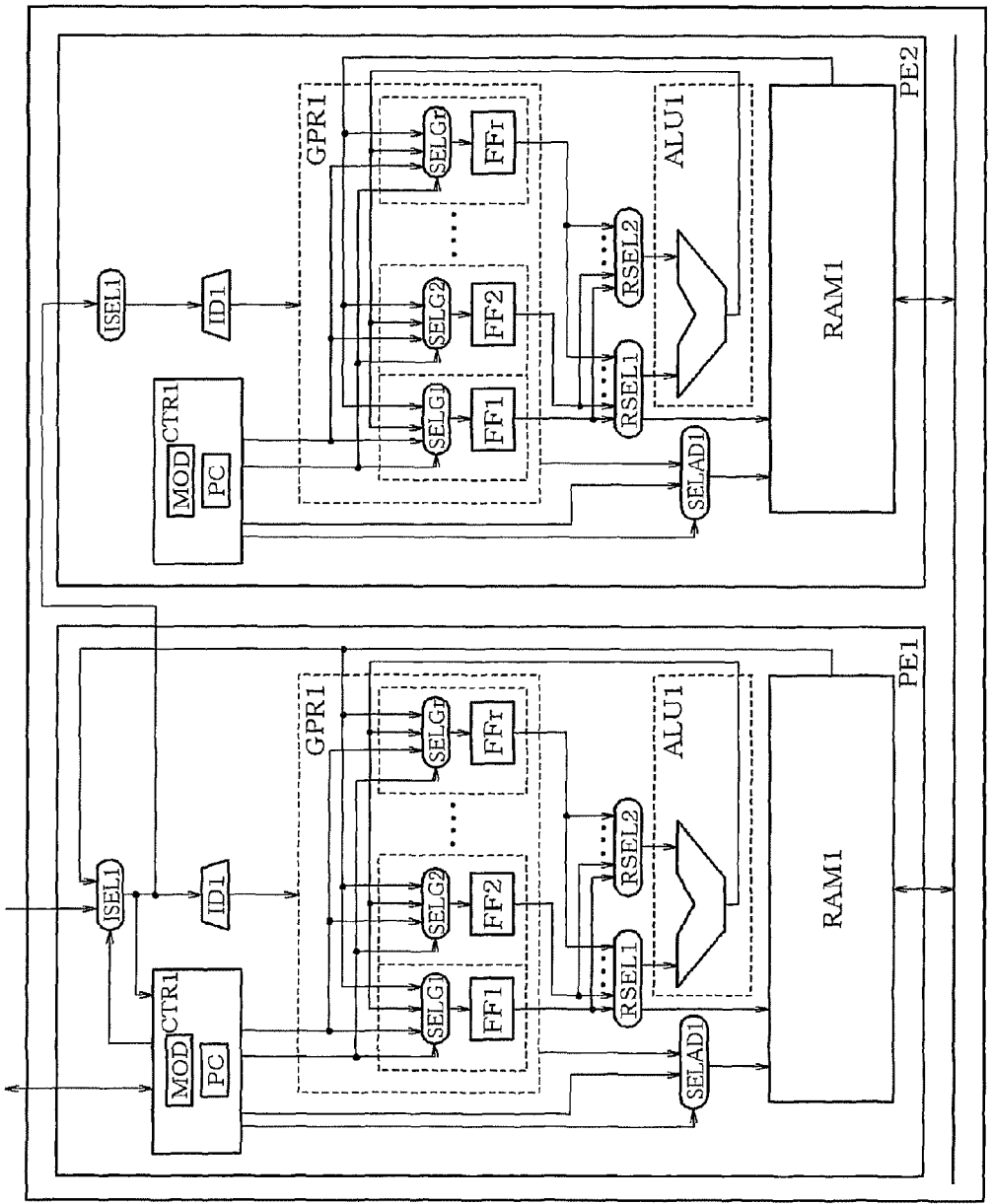
FIG. 6 is a block diagram showing the configuration of a second exemplary embodiment of the present invention.

A second exemplary embodiment of the present invention is now described in more detail with reference to the drawings. The configuration of the mixed mode parallel processor system PS of the present second exemplary embodiment is shown in a block diagram of FIG. 6. In this figure, the mixed mode parallel processor system PS of the present second exemplary embodiment includes processing elements PE1 and PE2 of the same hardware configuration. The processing element PE1 operates similarly to the processing element PE1 of the first exemplary embodiment. An output of the instruction stream selector ISEL1 of PE1 is delivered as an input to the instruction stream selector ISEL1 of PE2. The instruction stream selector ISEL1 of PE2 selects an output of the instruction stream selector ISEL1 of PE1 at all times.

In PE2, CTR1 exercises control so that the operation takes place using the instruction word output from ISEL1 of PEI. For example, a clamp terminal may be provided on the control circuit CTR1 of PE1 and PE2, so that, when CTR1 is clamped at '1', the operation is that of PE1 and, when CTR2 is clamped at '0', the operation is that of PE2.

With the above-described configuration of the second exemplary embodiment of the present invention, it is sufficient to fabricate PE1 and PE2 of the same configuration and hence the prime cost may be decreased.

The above-described first and second exemplary embodiments of the present invention may be firmware-controlled with the use of a micro-program.

The present invention may be applied to an application of implementing the mixed mode parallel processor, capable of dynamically switching between the SIMD and MIMD operations, at a reduced cost.

Although the present invention has so far been described with reference to preferred exemplary embodiments, the present invention is not to be restricted to the exemplary embodiments. It is to be appreciated that those skilled in the art can change or modify the exemplary embodiments without departing from the spirit and the scope of the present invention.

The invention claimed is:

1. A mixed mode parallel processor system comprising:
a plurality of processing units, each processing unit executing one MIMD operation and including a plurality of processing elements; and
a control processing element (CP) that selects SIMD mode or MIMD mode and broadcasts, upon selection of SIMD mode, an instruction that instructs all processing elements to perform SIMD operation,
each processing unit comprising:
at least one instruction stream selector in association with the processing elements belonging to the processing unit, said instruction stream selector changing over a control signal and data to be processed by the processing element(s) between SIMD mode and MIMD mode; and
at least one control circuit performing, for the plurality of processing elements in each of the processing units, instruction cache control and instruction sequence control, wherein in the MIMD mode operation, a memory included by one processing element among a plurality of processing elements making up said processing unit is made usable as an instruction cache memory; and a mode designation register that registers SIMD mode or MIMD mode designated by said control processing element; wherein in SIMD mode operation, the instruction stream selector in the processing unit selects an instruction from the control processing element, under control by the control circuit, the same instruction being sent to the plurality of the processing elements to perform parallel processing.

2. The mixed mode parallel processor system according to claim 1, wherein the processing unit includes at least a first processing element and a second processing element, the first and second processing elements each including an instruction decoder;

an arithmetic unit;

a read/write memory;

a group of selectors, each selecting an output of the arithmetic/logic unit or an output of the memory;

a group of registers receiving outputs of the selectors; and a selector selecting an output delivered to the arithmetic/logic unit, out of outputs of the register group;

the processing unit including the instruction stream selector and the control circuit in association with the first processing unit, the control circuit including a mode register, as set by the control processing element to determine under which one of the SIMD mode and the MIMD mode the system is to operate, and a program counter; wherein in SIMD mode operation, the instruction stream selector selects the instruction broadcast from the control processing element, under control by the control circuit;

the first and second processing elements decoding the same instruction to perform the arithmetic/logic processing.

* * * * *